(12) United States Patent
Sawada et al.

(10) Patent No.: US 7,035,554 B2
(45) Date of Patent: *Apr. 25, 2006

(54) IMAGE FORMING DEVICE AND REMOTE MONITORING SYSTEM FOR THE SAME

(75) Inventors: Masaichi Sawada, Tokyo (JP); Kiyohisa Koyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/067,716

(22) Filed: Mar. 1, 2005

(65) Prior Publication Data

US 2005/0147420 A1   Jul. 7, 2005

Related U.S. Application Data

(63) Continuation of application No. 10/026,742, filed on Dec. 27, 2001, now Pat. No. 6,876,819.

(30) Foreign Application Priority Data

Dec. 28, 2000 (JP) .............................. 2000-403521
Dec. 13, 2001 (JP) .............................. 2001-380454

(51) Int. Cl.
G03G 15/00 (2006.01)

(52) U.S. Cl. ........................................... 399/9; 399/81
(58) Field of Classification Search ............... 399/8–11, 399/14, 81

See application file for complete search history.

(56) References Cited

U.S. PATENT DOCUMENTS 4,084,900 A   4/1978   Yamaoka et al.
5,446,523 A   8/1995   Shimomura et al.
5,548,376 A   8/1996   Kikuno
5,636,008 A   6/1997   LoBiondo et al.
5,652,943 A   7/1997   Matsuo
5,715,496 A   2/1998   Sawada et al.
6,366,741 B1  4/2002   Fukushima
6,859,625 B1  2/2005   Sawada
6,876,819 B1* 4/2005   Sawada et al. ................. 399/9
2001/0003827 A1 6/2001  Shimamura

FOREIGN PATENT DOCUMENTS

JP   08087170 A   4/1996

\* cited by examiner

*Primary Examiner*—Susan Lee
(74) *Attorney, Agent, or Firm*—Oblon, Spivak, McClelland, Maier & Neustadt, P.C.

(57) ABSTRACT

An image forming device includes a communication unit connecting the device to a support center via a communication line and receiving and transmitting information by a communication with the support center. An error detecting unit detects an error of the device. A first warning unit controls, when the error is detected, an operation/display unit to display a repair call activation menu that indicates a defective condition of the device and enables a user to decide whether activation of a repair call transmitting function is allowed. A second warning unit controls a warning device to produce at least a warning sound indicating the defective condition of the device. When the defective condition of the device continues for a time, exceeding a predetermined period, without taking any repairing action, a warning executing unit executes either one of the warning controls of the first and second warning units or both.

28 Claims, 6 Drawing Sheets

IMAGE FORMING DEVICE AND REMOTE MONITORING SYSTEM FOR THE SAME

CROSS-REFERENCE TO RELATED APPLICATIONS

The present application is a continuation of U.S. application Ser. No. 10/026,742 filed on Dec. 27, 2001 U.S. Pat. No. 6,876,819, and in turn claims priority to JP 2000-403521 filed on Dec. 28, 2000 and JP 2001-380454 filed on Dec. 13, 2001, the entire contents of each of which are hereby incorporated herein by reference.

BACKGROUND OF THE INVENTION

1. Field of the Invention

The present invention relates to an image forming device, such as a copier, a facsimile or a printer. Moreover, the present invention relates to a remote monitoring system for managing an image forming device, including a host computer of a support center connected to the image forming device via a communication line.

2. Description of the Related Art

An image forming device having a warning function to notify the user that an error occurs in the image forming device and causes the abnormal end of the image forming device operation is known.

Moreover, a remote monitoring system is known, wherein an image forming device is connected via a communication line to a host computer of a support center at a remote location from the image forming device, the host computer remotely monitoring an operating condition of the image forming device by accessing a stored log information of the image forming device through the communication with the image forming device.

In the case of the remote monitoring system, when an error occurs in the image forming device, the image forming device automatically transmits a repair call to the support center via the communication line (which is called an automatic repair call function). The repair call is immediately received at the support center, and an operator on the host computer of the support center can communicate with the user on the image forming device by telephone for the purpose of providing the user with recovery information about the error of the image forming device.

Further, an image forming device having a function to store operational records of the device as log information is known. The host computer of the support center accesses the log information of the image forming device at given intervals through the communication with the image forming device via a public telephone network, and analyses the log information so that the operating conditions and the frequency of errors of the image forming device are detected.

As described above, in the case of the conventional remote monitoring system, when an error, such as paper jam, occurs in the image forming device, the image forming device carries out the automatic repair call function to send a repair call to the support center. The automatic repair call function is performed for every error occurring in the image forming device. When the repair call is received from the user, the operator on the host computer of the support center immediately analyses the contents of the received repair call (the error information and the user information) and confirms the log information of the image forming device. Then the operator telephones the user at the image forming device to provide the user with the error recovery information.

However, when the automatic repair call function as in the conventional remote monitoring system is used, the repair call is always transmitted to the support center even if a minor error occurs in the image forming device. It is likely that the minor error is already recovered by the user when the operator of the support center telephones the user to provide the user with the error recovery information. In such a case, the telephone call from the support center operator to the user causes the routine jobs of the user to be interrupted, which will be inconvenient for the user. Actually, the repair call transmitted in such a case does not help receive the recovery information from the support center, and the execution of the automatic repair call function makes inefficient the condition of the communication between the image forming device and the support center.

In addition, when various repair calls from different image forming devices are frequently transmitted to the support center by using the automatic repair call function, even if a minor error occurs, the work load of the support center operators become too large to deal with all such repair calls, and it is difficult that the support center operators provide the users with recover information for all the repair calls.

SUMMARY OF THE INVENTION

An object of the present invention is to provide an improved image forming device in which the above-described problems are eliminated.

Another object of the present invention is to provide an image forming device that keeps an appropriate condition of the communication between the image forming device and the support center and maintains an efficient running condition of the image forming device by causing, when an error of the image forming device is detected, the user to decide whether activation of the repair call transmission function is allowed or not.

Another object of the present invention is to provide a remote monitoring system that keeps an appropriate condition of the communication between the image forming device and the support center and maintains an efficient operating condition of the image forming device by causing, when an error of the image forming device is detected, the user to decide whether activation of the repair call transmission function is allowed or not.

The above-mentioned objects of the present invention are achieved by an image forming device comprising: a communication unit which connects the image forming device to an external support center via a communication line and receives and transmits information by a communication with the support center; an error detecting unit which detects an error of the image forming device; a first warning unit which controls, when the error is detected by the error detecting unit, an operation/display unit to display a repair call activation menu thereon that indicates a defective condition of the image forming device and enables a user to decide whether activation of a repair call transmitting function is allowed or not; a second warning unit which controls a warning device to produce at least a warning sound indicating the defective condition of the image forming device; and a warning executing unit which executes selectively one or both of the warning control of the first warning unit and the warning control of the second warning unit, wherein, when the defective condition of the image forming device continues for a time, exceeding a predetermined period, without taking any repairing action, the warning executing unit executing either one of the warning controls of the first and second warning units or both.

The above-mentioned objects of the present invention are achieved by a remote monitoring system including a host computer of a support center and an image forming device which are connected together via a communication line, the image forming device comprising: a communication unit which connects the image forming device to the host computer of the support center via the communication line and receives and transmits information by a communication with the host computer; an error detecting unit which detects an error of the image forming device; a first warning unit which controls, when the error is detected by the error detecting unit, an operation/display unit to display a repair call activation menu thereon that indicates a defective condition of the image forming device and enables a user to decide whether activation of a repair call transmitting function is allowed or not; a second warning unit which controls a warning device to produce at least a warning sound indicating the defective condition of the image forming device; and a warning executing unit which executes selectively one or both of the warning control of the first warning unit and the warning control of the second warning unit, wherein, when the defective condition of the image forming device continues for a time, exceeding a predetermined period, without taking any repairing action, the warning executing unit executing either one of the warning controls of the first and second warning units or both.

According to the image forming device and the remote monitoring system of the present invention, when the defective condition of the image forming device continues for a time, exceeding a predetermined period, without taking any repairing action, the warning executing unit executes either one of the warning controls of the first and second warning units or both. When a minor error occurs in the image forming device such that the user can easily detect and recover it, the image forming device of the present invention makes it possible to provide the user with a simplified warning only. When the user does not detects a defective condition of the image forming device for a long time without taking any repairing action, or when a severe error occurs such that the user cannot easily repair it, the image forming device of the present invention makes it possible to provide the user with the repair call activation menu, displayed on the operation/display unit, which causes the user to decide whether activation of the repair call transmitting function is allowed or not. Therefore, the image forming device of the present invention is effective in eliminating the problem that various repair calls from different image forming devices be frequently transmitted to the support center as in the conventional remote monitoring system. It is possible for the present invention to keep an appropriate condition of the communication between the image forming device and the support center and to maintain an efficient operating condition of the image forming device.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
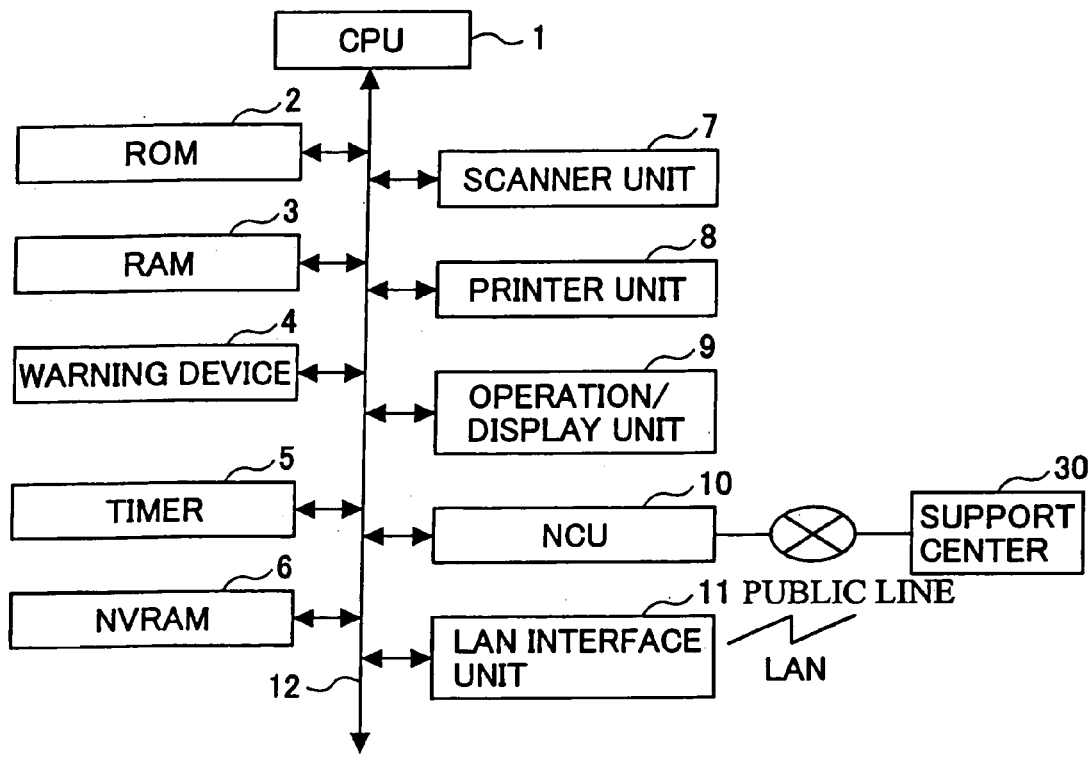
FIG. 1 is a block diagram of a digital complex device as one preferred embodiment of the image forming device of the invention, which is connected via a communication line to a support center in a remote monitoring system.

FIG. 1 shows a configuration of a digital complex device as one preferred embodiment of the image forming device of the invention, which is connected via a communication line to a support center in a remote monitoring system. The digital complex device in the present embodiment has the functions of a copier, a facsimile and a printer.

As shown in FIG. 1, the digital complex device generally includes a CPU (central processing unit) 1, a ROM (read-only memory) 2, a RAM (random access memory) 3, a warning device 4, a timer 5, an NVRAM (non-volatile RAM) 6, a scanner unit 7, a printer unit 8, an operation/display unit 9, an NCU (network control unit) 10, and an LAN (local area network) interface unit 11. These elements of the digital complex device are interconnected by a system bus 12.

In the image forming device of the present embodiment, the CPU 1 controls the respective elements of the digital complex device. The ROM 2 stores a basic system program for controlling the digital complex device, and the CPU 1 executes the system program from the ROM 2 to control each of the elements of the digital complex device.

The RAM 3 acts as a work memory used when the system program is executed by the CPU 1, and concurrently acts as a frame memory for storing image data.

The warning device 4 includes a speaker and a built-in flash. When an error occurs in the digital complex device, the speaker and the flash of the warning device 4 are activated to produce any combination of a warning sound, a synthesized voice or music, and a flash light, in order to clearly notify the user of the occurrence of the error in the digital complex device.

The timer 5 provides the digital complex device with a time measuring function. The timer 5 uses the oscillation frequency of a quartz oscillator to measure an elapsed time from a starting time point. Specifically, the timer 5 measures a period of time by counting the internal clocks of the CPU 1.

The NVRAM 6 is a rewritable non-volatile recording medium that retains stored information even when a power switch of the digital complex device is turned off. In the NVRAM 6, setting data of the respective functions of the digital complex device is stored. Every time the setting data of the NVRAM 6 is changed by the user using the operation/ display unit 9, the CPU 1 rewrites the stored information of the NVRAM 6 so as to reflect the changes of the setting data input by the user.

The scanner unit 7 performs an image reading function to optically read image data from an original document. The printer unit 8 performs an image printing function to form an image on paper based on the image data expanded in the RAM 3 as the frame memory.

The NCU 10 controls the connection of the digital complex device to and the disconnection of the digital complex device from a communication line, such as a public telephone network. The NCU 10 acts as a communication device of the digital complex device. Moreover, the NCU 10 acts to perform the facsimile communication function of the digital complex device. As shown in FIG. 1, the NCU 10 connects the digital complex device with a host computer of an external support center 30 at a remote location via the communication line such as the public telephone network, and receives and transmits information through the communication with the support center 30.

The LAN interface unit 11 acts to connect the digital complex device to a destination terminal (or a personal computer) over a local area network (LAN). The LAN interface unit 11 receives and transmits information through the communication with the destination terminal over the LAN.

The operation/display unit 9 is provided with a liquid crystal display (LCD) that serves as a touch panel. The operation/display unit 9 provides the user with indications of messages or operational information related to the digital complex device. The operation/display unit 9 acts as an input device that is used by the user to input the changes of the setting data of the NVRAM 6 related to the respective functions of the digital complex device, to the CPU 1. Moreover, the operation/display unit 9 provides the users with indications of operational messages and warning messages when an error occurs in the digital complex device. The operation/display unit 9 may include a speaker (which is shared with the warning device 4), and it is possible that the speaker of the operation/display unit 9 be activated to produce a warning sound or a synthesized sound when an error occurs in the digital complex device.

Figure 6:
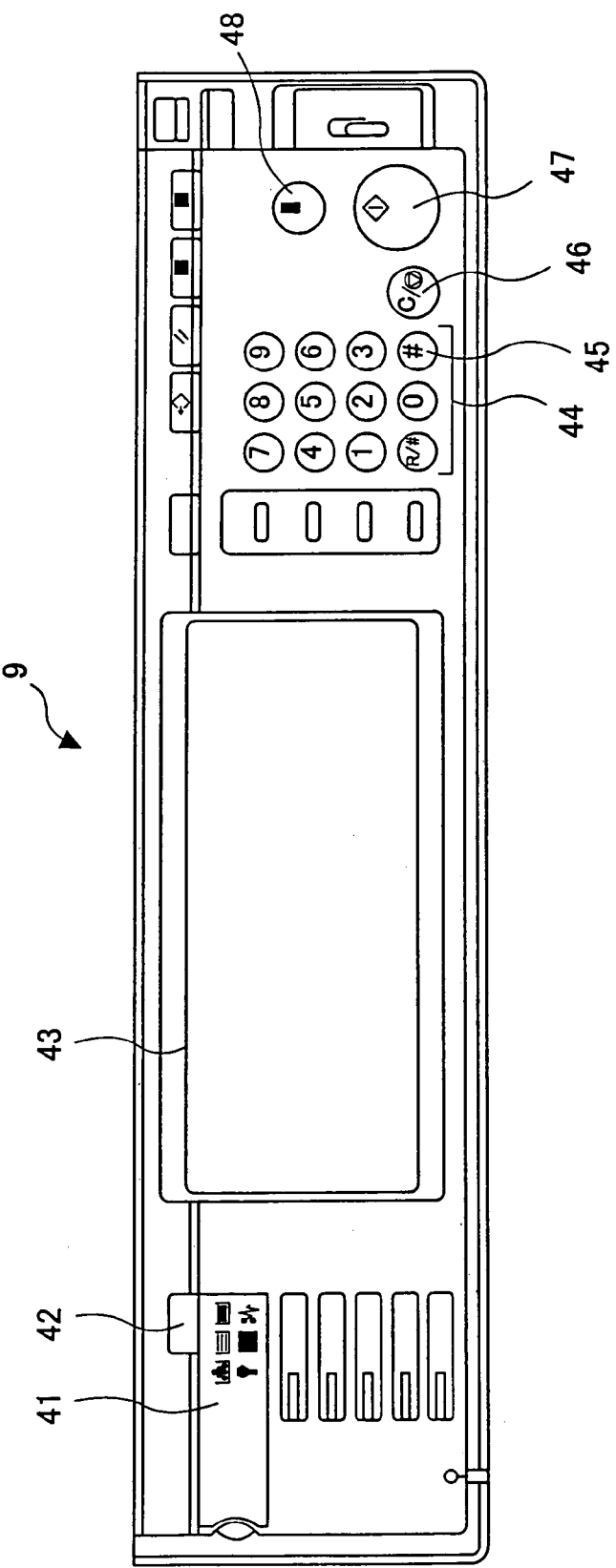
FIG. 6 is a diagram showing an operation/display unit in the image forming device in FIG. 1.

FIG. 6 shows a configuration of the operation/display unit 9 in the image forming device in FIG. 1. As shown in FIG. 6, the operation/display unit 9 generally includes an error/status indicator portion 41, an initial setting key 42, an LCD display portion 43, ten keys 44, an enter key 45, a temporary stop key 46, a start key 47, a test copy key 48, and so on.

In the operation/display unit 9 in FIG. 6, the error/status indicator portion 41 provides the user with indications of errors of the digital complex device and the operational states of the relevant mechanisms in the digital complex device. The initial setting key 42 is used when the user wishes to change the initial setting data or conditions of the digital complex device in accordance with the desired initial setting data or conditions. The LCD display portion 43 provides the user with indications of conditions of operations or messages related to the various functions of the digital complex device. A repair call activation menu displayed on the LCD display portion 43 according to the image forming device of the present embodiment will be described later with reference to FIG. 7.

The ten keys 44 are used when the user inputs various setting data. The enter key 45 is depressed by the user when changing various setting data or operational conditions of the digital complex device. The temporary stop key 46 is used when the user desires to temporarily stop operation of the digital complex device. The start key 47 is depressed by the user when starting a copying action of the digital complex device. The test copy key 48 is used when the user desires to output some of the reproduced images through the copying action to confirm the final conditions of the reproduced images.

Figure 7:
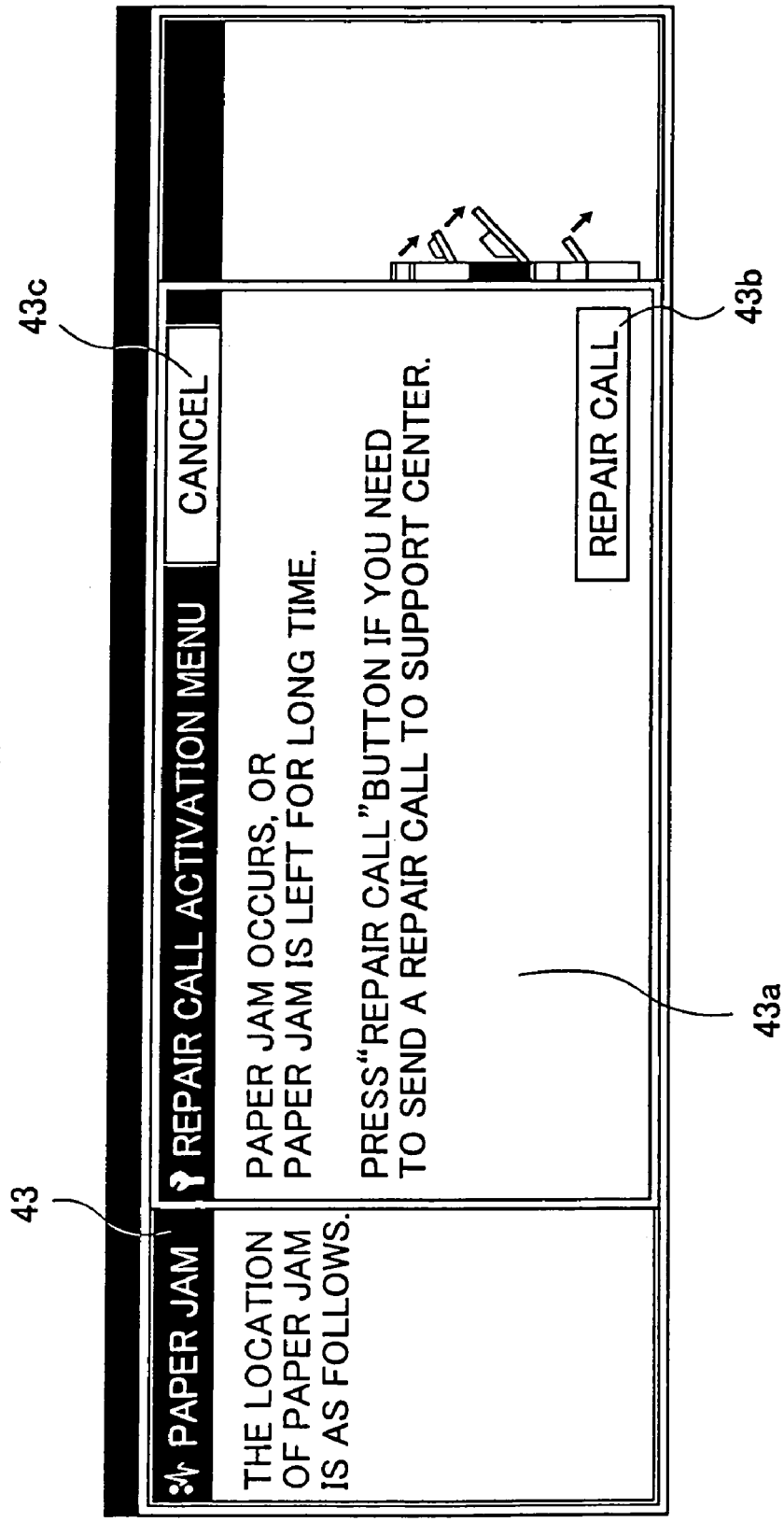
FIG. 7 is a diagram showing a repair call activation menu displayed on the operation/display unit in FIG. 6.

FIG. 7 shows a repair call activation menu 43a displayed on the LCD display portion 43 of the operation/display unit 9 in FIG. 6.

In the image forming device of the present embodiment, when an error of the image forming device is detected, or when a defective condition of the image forming device continues for a long time, exceeding a predetermined period, without taking any repairing action, the CPU 1 controls the operation/display unit 9 so that the repair call activation menu 43a, as shown in FIG. 7, is displayed on the LCD display portion 43 of the operation/display unit 9. The repair call activation menu 43a, as shown in FIG. 7, includes a repair call button 43b and a cancel button 43c, together with a message indicating the defective condition of the image forming device. If the user depresses the repair call button 43b on the touch panel, the CPU 1 controls the NCU 10 so that a repair call is transmitted from the image forming device to the host computer of the support center 30 via the communication line. If the user depresses the cancel button 43c on the touch panel, the CPU 1 does not perform the control of the NCU 10 so as to inhibit the transmission of a repair call to the support center 30.

In the digital complex device of the present embodiment, a warning control program is stored into the ROM 2, and the CPU 1 executes the warning control program from the ROM 2, which constitutes a warning control unit in the present embodiment. As described above, the warning control unit in the present embodiment controls, when an error of the image forming device is detected or when a defective condition of the image forming device continues for a long time without taking any repairing action, the operation/display unit 9 so that the repair call activation menu 43a indicating the defective condition of the image forming device is displayed on the operation/display unit 9. When the user selects the activation of the repair call transmitting function, the warning control unit in the present embodiment controls the NCU 10 so that a repair call is transmitted from the image forming device to the host computer of the support center 30 via the communication line. Otherwise the warning control unit in the present embodiment inhibits the repair call transmitting function.

Therefore, the digital complex device of the present embodiment has the function of transmitting a repair call to the support center 30 via the communication line by using the NCU 10 in accordance with the user selection. Alternatively, the digital complex device of the present embodiment may have the function of transmitting an e-mail, indicating a repair request, to the destination terminal (which is predetermined for the error notification) over the LAN by using the LAN interface unit 11 in accordance with the user selection.

Figure 2:
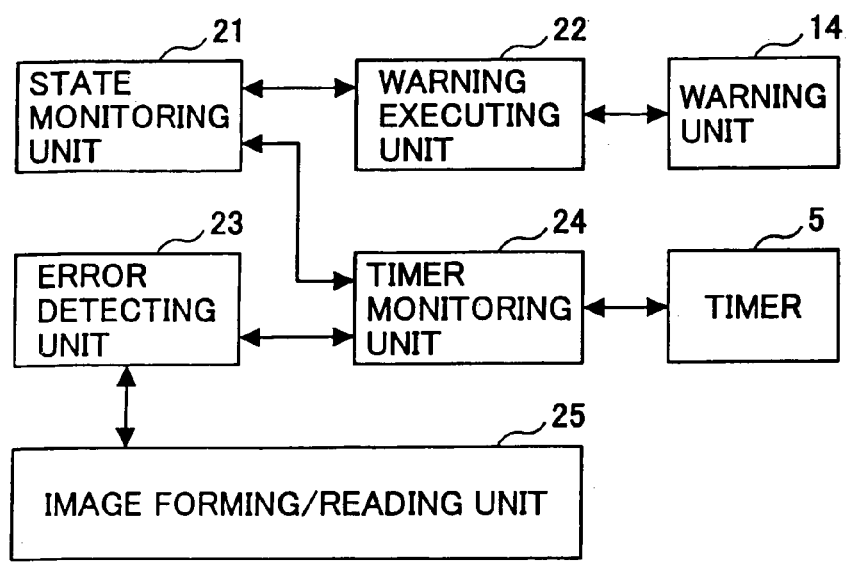
FIG. 2 is a block diagram of a warning control unit in the digital complex device in FIG. 1.

FIG. 2 shows a configuration of the warning control unit in the digital complex device in FIG. 1.

As shown in FIG. 2, the warning control unit in the present embodiment includes a warning unit 14, a state monitoring unit 21, a warning executing unit 22, an error detecting unit 23, a timer monitoring unit 24, and an image forming/reading unit 25. These elements of the warning control unit are constituted by the CPU 1 which executes the warning control program from the ROM 2.

The warning unit 14 includes a first warning unit and a second warning unit in combination, the first warning unit controlling the operation/display unit 9 to display the repair call activation menu 43a thereon when an error of the image forming device is detected, and the second warning unit controlling the warning device 4 to activate the speaker and the flash of the warning device 4 to produce any combination of a warning sound, a synthesized voice or music, and a flash light when an error of the image forming device is detected.

The error detecting unit 23 detects an error of the image forming device which may occur when any of the respective jobs of the copier, facsimile and printer functions are performed by the image forming/reading unit 25. Alternatively, the error detecting unit 23 may detect an error of the image forming device even when any of the respective jobs of the copier, facsimile and printer functions are not performed by the image forming/reading unit 25.

When an error of the image forming device is detected, the error detecting unit 23 causes the timer monitoring unit 24 to start monitoring of the timer 5 so that the timer monitoring unit 24 detects a period of time measured by the timer 5. The counting of the internal clocks by the timer 5 is started at the time when the error of the image forming device is detected. At this time, the LCD display portion 43 of the operation/display unit 9 provides the user with the indications of the error mark and message related to the detected error. And, when the operation/display unit 9 includes a speaker, the speaker is activated at this time to produce a warning sound or a synthesized sound.

The state monitoring unit 21 monitors the operating conditions of the image forming device. If the defective condition of the image forming device continues and any repairing action is not taken to the image forming device until a predetermined period has elapsed from the time of the error detection, the warning executing unit 22 determines that the warning sound or indication does not reach the user. At this time, the warning executing unit 22 causes the warning unit 14 to perform a selected one of the first warning control by the first warning unit and the second warning control by the second warning unit or both. If the defective condition of the image forming device further continues over the predetermined period without taking any repairing action, the warning unit 14 is controlled to repeat the performance of the same warning control.

In the present embodiment, the operation/display unit 9, the NVRAM 6 and the CPU 1 serve as a warning condition setting unit that changes the initial setting data, including a validity flag of the first warning unit and a validity flag of the second warning unit related to the warning unit 14, in accordance with the user demands. For example, when the user wishes to change the initial setting data of the first and second warning controls, the user may set the validity flags of the first and second warning control in ON state by using the operation/display unit 9. The CPU 1 rewrites the stored setting data of the NVRAM 6 so as to reflect the change of the setting data input by the user.

Further, in the present embodiment, the operation/display unit 9, the NVRAM 6 and the CPU 1 serve as a warning condition setting unit that changes the initial setting data, including the predetermined period value, a warning duration value, a warning interrupt duration value and the number of repeated warning attempts, in accordance with the user demands. For example, when the user wishes to change the warning duration value of the image forming device as one of the initial setting data, the user may set the warning duration value to a desired value by using the operation/display unit 9. The CPU 1 rewrites the stored setting data of the NVRAM 6 so as to reflect the change of the initial setting data input by the user.

Further, in the present embodiment, the operation/display unit 9, the NVRAM 6 and the CPU 1 serve as an operation restart/stop unit that automatically stops the warning control process of the warning control unit during an arbitrarily set stop period and restarts the warning control process of the warning control unit at an end of the stop period. For example, in the midnight or on holidays, the user is absent, and it is expected that the image forming device is left unused. To eliminate the problem, the user may set the stop period to a desired stop period value by using the operation/display unit 9. The CPU 1 rewrites the stored setting data of the NVRAM 6 so as to reflect the changes of the setting data input by the user.

In the above embodiment of FIG. 1, the digital complex device is provided to have a power-saved standby mode. In the power-saved standby mode, electric power from a power source (not shown) is not supplied to some of the elements of the digital complex device for the purpose of decreasing the power consumption. However, if the power supplied to the CPU 1, the ROM 2 and the RAM 3, the NVRAM 6 and the operation/display unit 9 is cut off in the power-saved standby mode, the warning control unit according to the present invention does not work. To avoid the problem, the second warning unit of the warning unit 14 and the warning executing unit 22 are activated even when the image forming device is set in a power-saved standby mode.

Figure 3:
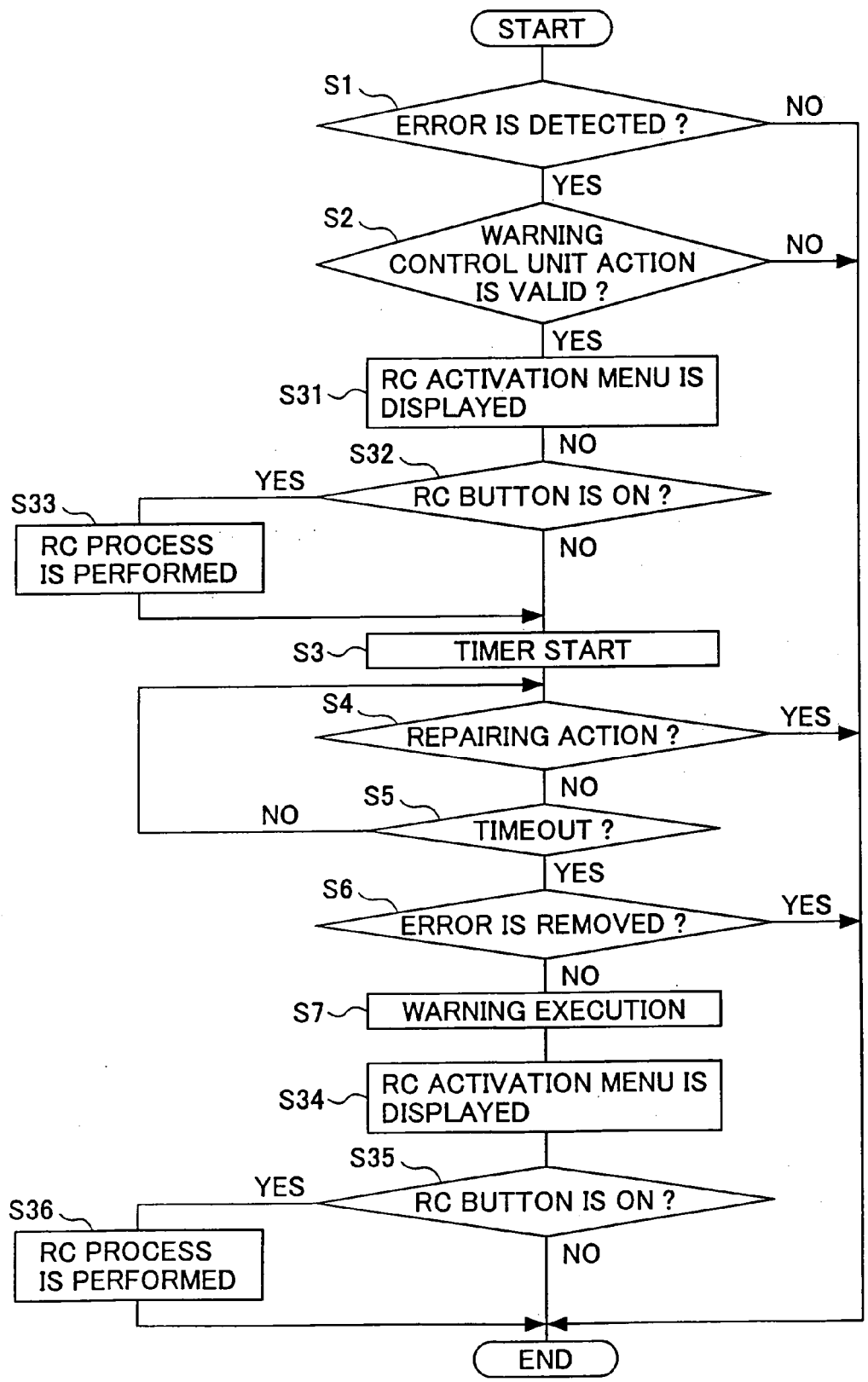
FIG. 3 is a flowchart for explaining a warning control process performed by the warning control unit of the present embodiment.

FIG. 3 shows a warning control process performed by the warning control unit of the present embodiment. In the present embodiment, the warning control process is carried out by the CPU 1 in accordance with the warning control program from the ROM 2.

As shown in FIG. 3, the CPU 1 at step SI determines whether an error of the image forming device is detected. When the result at the step S1 is affirmative, the CPU 1 at step S2 determines whether at least one of the validity flags of the first and second warning units of the warning unit 14 in the setting data stored in the NVRAM 6 is in ON state. On the other hand, when the result at the step S1 is negative, the warning control by the warning unit 14 is not needed, and the warning control process ends.

When the result at the step S2 is affirmative, it is determined that the warning control unit action is valid. The CPU 1 at step S31 controls the operation/display unit 9 to display the repair call (RC) activation menu 43a on the LCD display portion 43. In this step S31, the user is requested to decide whether activation of the repair call transmitting function is allowed or not. According to the decision, the user depresses the selected one of the repair call button 43b and the cancel button 43c in the repair call activation menu 43a. On the other hand, when the result at the step S2 is negative, it is determined that the warning control unit action is invalid, and the warning control process ends.

After the step S31 is performed, the CPU 1 at step S32 determines whether the repair call (RC) button 43b is depressed by the user. When the result at the step S32 is affirmative, the CPU 1 at step S33 controls the NCU 10 to perform the repair call (RC) process so that a repair call is transmitted to the support center 30 via the communication line. When the result at the step S32 is negative (or when the cancel button 43c is depressed), the CPU 1 does not perform the control of the NCU 10 to transmit a repair call to the support center 30. In other words, the CPU 1 at this time inhibits the transmission of a repair call to the support center 30.

After the step S33 is performed or when the result at the step S32 is negative, the CPU 1 at step S3 controls the timer 5 to start measuring an elapsed time.

After the step S3 is performed, the CPU 1 at step S4 determines whether any repairing action is taken to remove the error of the image forming device. When the result at the step S4 is negative, the CPU 1 at step S5 determines whether the elapsed time measured by the timer 5 exceeds the predetermined period. When the result at the step S4 is affirmative, the warning control by the warning unit 14 is not needed, and the warning control process ends.

When the result at the step S5 is affirmative, the CPU 1 at step S6 determines whether the error of the image forming device is removed. On the other hand, when the result at the step S5 is negative, the control of the CPU 1 is transferred to the above step S4.

When the result at the step S6 is negative, it is determined that any repairing action is not taken and the elapsed time exceeds the predetermined period. In other words, the user does not detect the defective condition of the image forming device. At this time, the CPU 1 at step S7 controls the warning device 4 (or activates the speaker and the flash of the warning device 4) to produce any combination of a warning sound, a synthesized voice or music, and a flash light, in order to clearly notify the user of the occurrence of the error in the image forming device. On the other hand, when the result at the step S6 is affirmative, the warning control by the warning unit 14 is not needed, and the warning control process ends.

After the step S7 is performed, the CPU 1 at step S34 controls the operation/display unit 9 to display the repair call (RC) activation menu 43a on the LCD display portion 43. In the step S34, the user is requested to decide whether activation of the repair call transmitting function is allowed or not. According to the decision, the user depresses the selected one of the repair call button 43b and the cancel button 43c in the repair call activation menu 43a.

After the step S34 is performed, the CPU 1 at step S35 determines whether the repair call (RC) button 43b is depressed by the user. When the result at the step S35 is affirmative, the CPU 1 at step S36 controls the NCU 10 to perform the repair call (RC) process so that a repair call is transmitted to the support center 30 via the communication line. When the result at the step S35 is negative (or when the cancel button 43c is depressed), the CPU 1 does not perform the control of the NCU 10 to transmit a repair call to the support center 30. In other words, the CPU 1 at this time inhibits the transmission of a repair call to the support center 30.

After the step S36 is performed, or when the result at the step S35 is negative, the warning control process ends.

In alternative embodiment, if the number of repeated warning attempts is set into the initial setting data of the NVRAM 6, it is necessary that an additional step that increments the count of currently performed warning attempts be incorporated into a location just following the step S7 (the warning execution) in the flowchart in FIG. 3.

In alternative embodiment, if the validity flags related to the warning unit 14 are not set in the initial setting data of the NVRAM 8, the step S2 in the flowchart in FIG. 3 may be omitted.

In the above embodiment of FIG. 3, the steps S31 through S33 are performed to request, when an error of the image forming device is detected, the user to decide whether activation of the repair call transmitting function is allowed or not. Alternatively, the steps S31 through S33 may be omitted in accordance with the user demands. In such alternative embodiment, instead of the steps S31 through S33 described above, the CPU 1 may control the warning device 4 to produce any combination of a warning sound, a synthesized voice or music, and a flash light, in order to clearly notify the user of the occurrence of the error in the image forming device.

Alternatively, instead of the steps S31 through S33 in the flowchart of FIG. 3, the CPU 1 may control the NCU 10 to perform the repair call (RC) process so that a repair call is transmitted to the support center 30 via the communication line. In such alternative embodiment, the automatic repair call function is executed instead of the warning control of the second warning unit of the warning unit 14 at the steps S31 through S33.

Further, in the above embodiment of FIG. 3, the steps S34 through S36 are performed to request, when a defective condition of the image forming device continues for a long time, exceeding a predetermined period, without taking any repairing action, the user to decide whether activation of the repair call transmitting function is allowed or not. Alternatively, the steps S34 through S36 may be omitted in accordance with the user demands. In such alternative embodiment, only the step S7 is performed and the steps S34 through S36 are not performed. Namely, the warning device 4 is solely controlled to produce any combination of a warning sound, a synthesized voice or music, and a flash light, in order to clearly notify the user of the occurrence of the error in the image forming device.

Alternatively, instead of the steps S34 through S36 in the flowchart of FIG. 3, the CPU 1 may control the NCU 10 to perform the repair call (RC) process so that a repair call is transmitted to the support center 30 via the communication line. Namely, in such alternative embodiment, the automatic repair call function is executed instead of the steps S34 through S36, and the step S7 is performed to control the warning device 4 to produce the warning sound and/or the flash light.

Alternatively, the determination as to whether the error is removed (the step S6) may be made at the intermediate location between the step S4 and the step S5 in the flowchart of FIG. 3. In such alternative embodiment, when it is determined that the error is removed, the warning control by the warning unit 14 is no longer needed, and the warning control process ends. According to such alternative embodiment, it is possible that the warning control by the warning unit 14 clearly draw the attention of the user when the defective condition of the image forming device.

There are various methods to execute the warning control by the warning device 14. When two or more warning controls may be executed, it is possible to provide the initial setting data of the NVRAM 6 that define the specific elements of the image forming device to be used for the warning control. Alternatively, it is possible to define the initial setting data of the NVRAM 6 such that the number of repeated warning attempts for one of the plural warning controls and the number of repeated warning attempts for another warning control are different. For example, the initial setting data may be defined such that the warning sound be produced for the first and second warning attempts and the indication of the repair call activation menu be performed for the subsequent warning attempts.

As described earlier, the digital complex device of the present embodiment is configured to allow the user to change the initial setting data related to the warning unit 14 (the validity flags of the first and second warning units). For example, when changing the initial setting data, the user depresses the initial setting key 42 on the operation/display unit 9 in the waiting condition of the digital complex device, and selects the operation so that an initial setting data change menu (not shown) is displayed on the LCD display portion 43. The user can input the changes of the initial setting data in the NVRAM 6 to the desired operational conditions of the digital complex device by using the ten keys 44. The CPU 1 rewrites the stored information of the NVRAM 6 so as to reflect the changes of the initial setting data input by the user. In this case, the operation/display unit 9, the NVRAM 6 and the CPU 1 serve as the warning condition setting unit. When executing the warning control process, the CPU 1 at the step S2 determines whether the validity flags of the warning unit 14 are in ON state, by reading the stored initial setting data from the NVRAM 6. After the ON state of the validity flags of the warning unit 14 is confirmed, the CPU 1 performs the steps S31–S33 in the flowchart of FIG. 3. Similarly, by using the operation/display unit 9, the NVRAM 6 and the CPU 1, it is possible to change the initial setting data including the predetermined period value, the warning duration value, a warning interrupt duration value and the number of repeated warning attempts in accordance with the user demands.

According to the image forming device of the above described embodiment, when a minor error occurs in the image forming device such that the user can easily detect and recover it, the image forming device makes it possible to provide the user with a simplified warning only. When the user does not detects a defective condition of the image forming device for a long time without taking any repairing action, or when a severe error occurs such that the user cannot easily repair it, the image forming device makes it possible to provide the user with the repair call activation menu 43a, displayed on the operation/display unit 9, which causes the user to decide whether activation of the repair call transmitting function is allowed or not. Therefore, the image forming device of the above-described embodiment is effective in eliminating the problem that various repair calls from different image forming devices be frequently transmitted to the support center as in the conventional remote monitoring system. It is possible for the present invention to keep an appropriate condition of the communication between the image forming device and the support center and to maintain an efficient operating condition of the image forming device.

In the above-described embodiment, the warning execution is performed when an error of the image forming device is detected. However, it is conceivable that there is the possibility that the image forming device be placed in an inappropriate operating condition even when any error is not detected. For example, when the image forming device continues to be used by a specific user over a predetermined running period, or when the image forming device continues to be in a waiting state over a predetermined waiting period, the operating condition of the image forming device in such cases is inappropriate for increasing the availability factor.

The warning control unit of the image forming device of the present invention may be configured to eliminate the above problem. A description will now be given of such configurations of the warning control unit according to the present invention.

Figure 4:
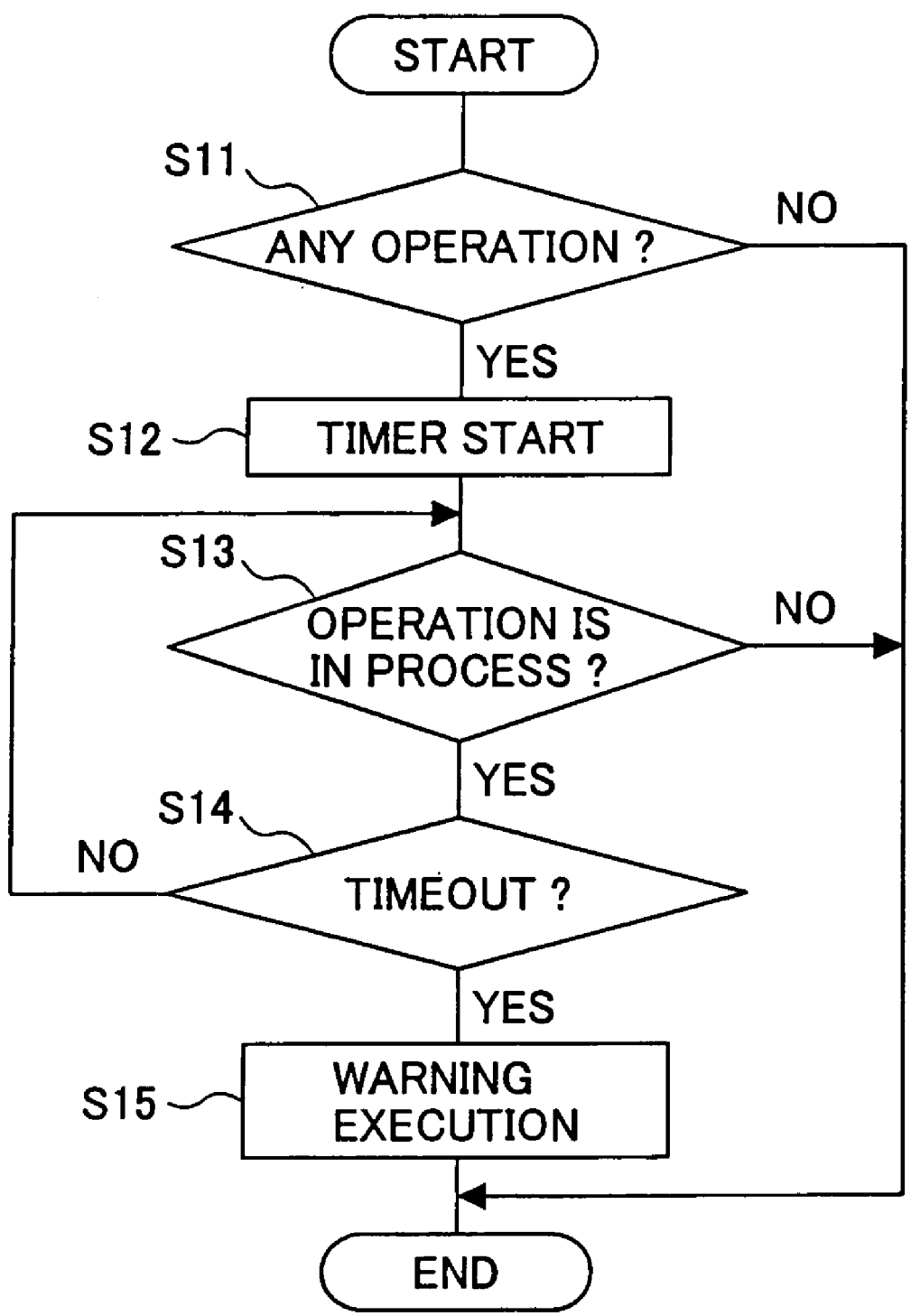
FIG. 4 is a flowchart for explaining a long-time running-state warning control process performed by the warning control unit in another preferred embodiment of the image forming device.
Figure 5:
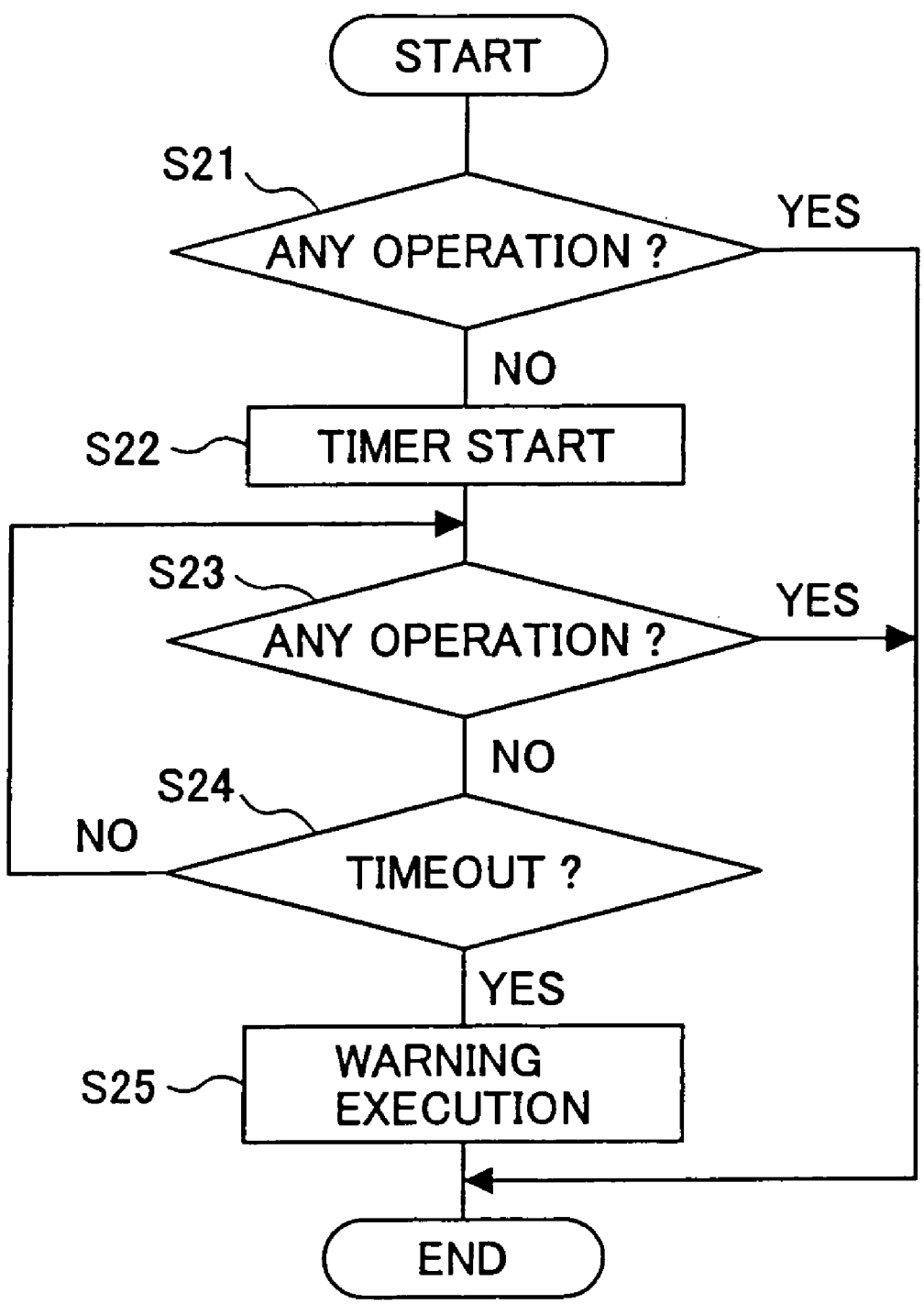
FIG. 5 is a flowchart for explaining a long-time waiting-state warning control process performed by the warning control unit in another preferred embodiment of the image forming device.

FIG. 4 shows a long-time running-state warning control process performed by the warning control unit in another preferred embodiment of the image forming device of the invention. FIG. 5 shows a long-time waiting-state warning control process performed by the warning control unit in another preferred embodiment of the image forming device of the invention.

The warning control process shown in FIG. 4 is performed by the CPU 1 when the warning concerning a long-time running-state condition of the image forming device is needed. As shown in FIG. 4, the CPU 1 at step S1 determines whether the image forming device is in a running state. In the step S11, if any operation or action is performed on the image forming device, it is determined that the image forming device is in a running state. When the result at the step S11 is affirmative, the CPU 1 at step S12 controls the timer 5 to start measuring an elapsed time. When the result at the step S11 is negative, the warning control by the warning unit 14 is not needed, and the warning control process ends.

After the step S12 is performed, the CPU 1 at step S13 determines whether the running state of the image forming device still continues. When the result at the step S13 is affirmative, the CPU 1 at step S14 determines whether the elapsed time exceeds a predetermined running period. When the result at the step S14 is negative, the control of the CPU 1 is transferred to the step S13.

On the other hand, when the result at the step S13 is negative, the warning control by the warning unit 14 is not needed, and the warning control process ends.

When the result at the step S14 is affirmative, the CPU 1 at step S15 controls the warning unit 14 to perform a selected one of the first warning control by the first warning unit and the second warning control by the second warning unit or both. After the step S15 is performed, the warning control process ends.

The warning control process in FIG. 5 is performed by the CPU 1 when the warning concerning a long-time waiting-state condition of the image forming device is needed. As shown in FIG. 5, the CPU 1 at step S21 determines whether the image forming device is in a running state. In the step S21, if any operation or action is performed on the image forming device, it is determined that the image forming device is in a running state. When the result at the step S21 is negative, the CPU 1 at step S22 controls the timer 5 to start measuring an elapsed time. When the result at the step S21 is affirmative, the warning control by the warning unit 14 is not needed, and the warning control process ends.

After the step S22 is performed, the CPU 1 at step S23 determines whether the image forming device is in a running state. In the step S23, if any operation or action is performed on the image forming device, it is determined that the image forming device is in a running state. When the result at the step S23 is negative, the CPU 1 at step S24 determines whether the elapsed time exceeds a predetermined waiting period. When the result at the step S24 is negative, the control of the CPU 1 is transferred to the step S23.

On the other hand, when the result at the step S23 is affirmative, the warning control by the warning unit 14 is not needed, and the warning control process ends.

When the result at the step S24 is affirmative, the CPU 1 at step S25 controls the warning unit 14 to perform a selected one of the first warning control by the first warning unit and the second warning control by the second warning unit or both. After the step S25 is performed, the warning control process ends.

According to the above embodiments of FIG. 4 and FIG. 5, when the warning concerning a long-time waiting-state condition or a long-time running-state condition of the image forming device is needed, the image forming device makes it possible to provide the user with the warning produced by the warning unit 14. Similar to the previous embodiment of FIG. 3, the operation/display unit 9, the NVRAM 6 and the CPU 1 serve as a warning condition setting unit that changes the initial setting data, including the predetermined period value, a warning duration value, a warning interrupt duration value and the number of repeated warning attempts, in accordance with the user demands, in the embodiments of FIG. 4 and FIG. 5 as well.

The present invention is not limited to the above-described embodiments, and variations and modifications may be made without departing from the scope of the present invention.

Further, the present invention is based on Japanese priority application No. 2000-403521, filed on Dec. 28, 2000, and Japanese priority application No. 2001-380454, filed on Dec. 13, 2001, the entire contents of which are hereby incorporated by reference.

What is claimed is:

1. An image forming device, comprising:
a warning executing unit executing selectively one or both of a warning control of a first warning unit and a warning control of a second warning unit, wherein, when a defective condition of the image forming device continues for a time, exceeding a predetermined period, without repair, the warning executing unit executes either of the warning controls of the first and second warning units or both.

2. An image forming device, comprising:
a warning executing unit executing selectively one or both of a warning control of a first warning unit and a warning control of a second warning unit, wherein, when an error is detected, the warning executing unit executes the warning control of the second warning unit, and when a defective condition of the image forming device continues for a time, exceeding a predetermined period, without repair, the warning executing unit executes the warning control of the first warning unit.

3. An image forming device, comprising:
a warning executing unit executing selectively one or both of a warning control of a first warning unit and a warning control of a second warning unit, wherein, when a defective condition of the image forming device continues for a time, exceeding a predetermined period, without repair, the warning executing unit executes either of the warning controls of the first and second warning units.

4. An image processing device, comprising:
an error detecting unit detecting an error of the image processing device;
a first warning unit;
a second warning unit; and
a warning executing unit executing selectively one or both of a warning control of the first warning unit and a warning control of the second warning unit, wherein, when a defective condition of the image processing device continues for a predetermined period, the warning executing unit executes either of the warning controls of the first and second warning units or both.

5. The image processing device according to claim 4, wherein the first warning unit controls a display unit to indicate the defective condition of the image processing device.

6. The image processing device according to claim 4, wherein the second warning unit controls a warning device to produce any combination of a warning sound, a synthesized voice or music, and a flash light.

7. The image processing device according to claim 4, further comprising a warning condition setting unit that changes initial setting data, including a validity flag of the first warning unit and a validity flag of the second warning unit, in accordance with user demands.

8. The image processing device according to claim 4, wherein the second warning unit and the warning executing unit are activated even when the image processing device is set in a power-saved standby mode.

9. The image processing device according to claim 4, further comprising a warning condition setting unit that changes initial setting data, including a predetermined period value, a warning duration value, a warning interrupt duration value and the number of repeated warning attempts, in accordance with user demands.

10. The image processing device according to claim 4, further comprising an operation restart/stop unit that stops the warning control processes of the first and second warning units during an arbitrarily set stop period and restarts the warning control processes at an end of the stop period.

11. The image processing device according to claim 4, wherein the warning executing unit executes the warning control of the second warning unit when the image forming device continues to be in a running state over a predetermined running period.

12. The image processing device according to claim 4, wherein the warning executing unit executes the warning control of the second warning unit when the image processing device continues to be in a waiting state over a predetermined waiting period.

13. The image processing device according to claim 4, wherein a warning device includes a speaker and a built-in flash.

14. An image processing device, comprising:
an error detecting unit detecting an error of the image processing device;
a first warning unit;
a second warning unit; and
a warning executing unit executing selectively one or both of a warning control of the first warning unit and a warning control of the second warning unit, wherein, when the error is detected by the error detecting unit, the warning executing unit executes the warning control of the second warning unit, and when a defective condition of the image processing device continues for a predetermined period, the warning executing unit executes either of the warning controls of the first and second warning units or both.

15. The image processing device according to claim 14, wherein the first warning unit controls a display unit to indicate the defective condition of the image processing device.

16. The image processing device according to claim 14, wherein the second warning unit controls a warning device to produce any combination of a warning sound, a synthesized voice or music, and a flash light.

17. An image processing device, comprising:
an error detecting unit detecting an error of the image processing device;
a first warning unit;
a second warning unit; and
a warning executing unit executing selectively one or both of a warning control of the first warning unit and a warning control of the second warning unit, wherein, when the error is detected by the error detecting unit, the warning executing unit executes the warning control of the second warning unit, and when a defective condition of the image processing device continues for a predetermined period, the warning executing unit executes either of the warning controls of the first and second warning units.

18. The image processing device according to claim 17, wherein the first warning unit controls a display unit to indicate the defective condition of the image processing device.

19. The image processing device according to claim 17, wherein the second warning unit controls a warning device to produce any combination of a warning sound, a synthesized voice or music, and a flash light.

20. An image processing method, comprising:
   detecting an error of an image processing device;
   executing selectively one or both of a warning control of a first warning unit and a warning control of a second warning unit, wherein, when a defective condition of the image processing device continues for a predetermined period, either of the warning controls of the first and second warning units or both are executed.

21. The image processing method according to claim 20, wherein the first warning unit controls a display unit to indicate the defective condition of the image processing device.

22. The image processing method according to claim 20, wherein the second warning unit controls a warning device to produce any combination of a warning sound, a synthesized voice or music, and a flash light.

23. An image processing method, comprising:
   detecting an error of an image processing device;
   executing selectively one or both of a warning control of a first warning unit and a warning control of a second warning unit, wherein, when the error is detected, the warning control of the second warning unit is executed, and when a defective condition of the image processing device continues for a predetermined period, either of the warning controls of the first and second warning units or both are executed.

24. The image processing method according to claim 23, wherein the first warning unit controls a display unit to indicate the defective condition of the image processing device.

25. The image processing method according to claim 23, wherein the second warning unit controls a warning device to produce any combination of a warning sound, a synthesized voice or music, and a flash light.

26. An image processing method, comprising:
   detecting an error of an image processing device;
   executing selectively one or both of a warning control of a first warning unit and a warning control of a second warning unit, wherein, when the error is detected, the warning control of the second warning unit is executed, and when a defective condition of the image processing device continues for a predetermined period, either of the warning controls of the first and second warning units is executed.

27. The image processing method according to claim 26, wherein the first warning unit controls a display unit to indicate the defective condition of the image processing device.

28. The image processing method according to claim 26, wherein the second warning unit controls a warning device to produce any combination of a warning sound, a synthesized voice or music, and a flash light.

* * * * *